(12) United States Patent
Lu et al.

(10) Patent No.: US 11,521,370 B2
(45) Date of Patent: Dec. 6, 2022

(54) POINT CLOUD DATA PROCESSING METHOD, APPARATUS, ELECTRONIC DEVICE AND COMPUTER READABLE STORAGE MEDIUM

(71) Applicant: Beijing Baidu Netcom Science and Technology Co., Ltd., Beijing (CN)

(72) Inventors: Weixin Lu, Beijing (CN); Guowei Wan, Beijing (CN); Li Yu, Beijing (CN); Liang Peng, Beijing (CN); Shiyu Song, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/184,363

(22) Filed: Feb. 24, 2021

(65) Prior Publication Data

US 2021/0264197 A1 Aug. 26, 2021

(30) Foreign Application Priority Data

Feb. 25, 2020 (CN) .......................... 202010116037.6

(51) Int. Cl.
*G06T 7/33* (2017.01)
*G06V 10/75* (2022.01)
(52) U.S. Cl.
CPC ............ *G06V 10/757* (2022.01); *G06T 7/337* (2017.01)
(58) Field of Classification Search
CPC .................. G06T 7/33; G06T 2200/24; G06T 2207/10028; G06T 2200/04
See application file for complete search history.

(56) References Cited

U.S. PATENT DOCUMENTS

2019/0188872 A1 6/2019 Aflalo et al.

FOREIGN PATENT DOCUMENTS

JP 2008077626 A 4/2008
JP 2015156136 A 8/2015

OTHER PUBLICATIONS

European Search Report, EP Application No. 21159007.0, dated Jun. 30, 2021, 8 pages.

(Continued)

*Primary Examiner* — Sam Bhattacharya
(74) *Attorney, Agent, or Firm* — Kwan & Olynick LLP (57) ABSTRACT

The present disclosure provides a point cloud data processing method, apparatus, electronic device and computer readable storage medium, which relates to computer vision technology and may be used for autonomous driving. A specific implementation solution is as follows: obtaining a first feature vector of each point in first point cloud data, and determining at least one first key point in the points in the first point cloud data according to the first feature vectors of respective points; according to the and a preset first conversion parameter between second point cloud data and the first point cloud data, obtaining second key points of the second point cloud data corresponding to the first key points in the at least one first key point, as candidate matching points; according to the first point cloud data, the second point cloud data and a preset search radius, determining at least one first neighboring point of the and at least one second neighboring point of the candidate matching point corresponding to the at least one first key point; determining a matching point with which the at least one first key point is registered, according to the at least one first neighboring point of the at least one first key point and the at least one second neighboring point of the candidate matching points.

17 Claims, 4 Drawing Sheets

(56) References Cited

OTHER PUBLICATIONS

Weixin Lu et al., "DeepVCP: An End-to-End Deep Neural Network for Point Cloud Registration", 2019 IEEE/CVF International Conference on Computer Vision, Oct. 27, 2019, pp. 12-21.
Wei Li et al., "Pairwise registration of TLS point clouds by deep multi-scale local features", Neurocomputing, Elsevier, Amsterdam, NL, vol. 386, Dec. 23, 2019, pp. 232-243.
Japanese First Office Action for App. No. JP-2021-29051, 2 pages.
Multi-view ICP algorithm with initial position estimation High-accuracy integration of point shot point clouds-EN, 1 page.
Multi-view ICP algorithm with initial position estimation High-accuracy integration of point shot point clouds-JP, 7 pages.

POINT CLOUD DATA PROCESSING METHOD, APPARATUS, ELECTRONIC DEVICE AND COMPUTER READABLE STORAGE MEDIUM

The present application claims the priority of Chinese Patent Application No. 202010116037.6, filed on Feb. 25, 2020, with the title of "Point cloud data processing method, apparatus, electronic device and computer readable storage medium". The disclosure of the above application is incorporated herein by reference in its entirety.

FIELD OF THE DISCLOSURE

The present disclosure relates to computer technologies, specifically to computer vision technology, and particularly to a point cloud data processing method, apparatus, electronic device and computer readable storage medium for use in autonomous driving.

BACKGROUND OF THE DISCLOSURE

Point cloud data is a set of point data of an external surface of an object obtained by a measuring instrument, and a digitalized representation form of real world. The point cloud data has a very high application value in fields such as building protection, 3D map and biomedicine. Point cloud registration is a basic technique in the field of 3D vision, and it aims to unify point cloud data collected from different viewing angles to a designated coordinate system.

Since the point cloud registration technique is an important technique employed in a basic section (cloud point registration) in the application process of the point cloud data, the efficiency of the point cloud registration technique is critical for the application of the point cloud data.

SUMMARY OF THE DISCLOSURE

A plurality of aspects of the present disclosure provide a point cloud data processing method, apparatus, electronic device and computer readable storage medium to improve the efficiency of point cloud registration.

In an aspect of the present disclosure, there is provided a point cloud data processing method, comprising:

obtaining a first feature vector of each point in first point cloud data, and determining at least one first key point in the points in the first point cloud data according to the first feature vectors of respective points;

according to the and a preset first conversion parameter between second point cloud data and the first point cloud data, obtaining second key points of the second point cloud data corresponding to the first key points in the, as candidate matching points; wherein the first point cloud data and the second point cloud data are point cloud data of the same scene obtained from different viewing angles;

according to the first point cloud data, the second point cloud data and a preset search radius, determining at least one first neighboring point of the at least one first key point and at least one second neighboring point of the candidate matching point corresponding to the;

determining a matching point with which the is registered, according to the at least one first neighboring point of the at least one first key point and the at least one second neighboring point of the candidate matching points.

The above aspect and any possible implementation further provide an implementation: the method further comprises:

performing registration processing for the first point cloud data and second point cloud data according to the and the at least one matching point with which the is registered.

The above aspect and any possible implementation further provide an implementation: the step of, according to the first point cloud data, the second point cloud data and a preset search radius, determining at least one first neighboring point of the and at least one second neighboring point of the candidate matching point corresponding to the comprises:

regarding each first key point, determining a preset number of first neighboring points of the first key point according to the first point cloud data and a preset search radius; and, regarding the candidate matching points, determining a preset number of second neighboring points of the candidate matching points according to the second point cloud data and the preset search radius.

The above aspect and any possible implementation further provide an implementation: the step of, regarding each first key point, determining a preset number of first neighboring points of the first key point according to the first point cloud data and a preset search radius comprises:

determining a search space as a field space of the first key point, according to the preset search radius with the first key point as a center;

determining a preset number of points in the field space of the first key point as the first neighboring points of the first key point according to the first point cloud data.

The above aspect and any possible implementation further provide an implementation: the step of, regarding the candidate matching points, determining a preset number of second neighboring points of the candidate matching points according to the second point cloud data and the preset search radius comprises:

determining a search space according to the preset search radius with the candidate matching point as a center, as a field space of the candidate matching point;

determining a preset number of points in the field space of the candidate matching point as the second neighboring points of the candidate matching point according to the second point cloud data.

The above aspect and any possible implementation further provide an implementation: the determining a matching point with which the at least one first key point is registered according to the at least one first neighboring point of the at least one first key point and the at least one second neighboring point of the candidate matching points comprises:

obtaining third feature vectors of the first key points according to information of the first neighboring points of the first key points, and obtaining fourth feature vectors of the candidate matching points according to information of the second neighboring points of the candidate matching points;

obtaining offset vectors of the candidate matching points according to the third feature vectors and the fourth feature vectors;

generating matching points with which the first key points are registered according to the candidate matching points and the offset vectors of the candidate matching points.

The above aspect and any possible implementation further provide an implementation: the obtaining offset vectors of the candidate matching points according to the third feature vectors and the fourth feature vectors comprises:

obtaining matching feature vectors of the candidate matching points according to the third feature vectors and the fourth feature vectors;

performing dimension reduction processing for the matching feature vectors of the candidate matching points to obtain the offset vectors of the candidate matching points.

The above aspect and any possible implementation further provide an implementation: the method further comprises:

adjusting the search radius, and using each adjusted search radius to obtain the third feature vectors and fourth feature vectors corresponding to the search radius.

In another aspect of the present disclosure, there is provided an electronic device, comprising:

at least one processor; and a memory communicatively connected with the at least one processor;

wherein the memory stores instructions executable by the at least one processor, and the instructions are executed by the at least one processor to enable the at least one processor to perform a point cloud data processing method, wherein the point cloud data processing method comprises:

obtaining a first feature vector of each point in first point cloud data, and determining at least one first key point in the points in the first point cloud data according to the first feature vectors of respective points;

according to the and a preset first conversion parameter between second point cloud data and the first point cloud data, obtaining second key points of the second point cloud data corresponding to the first key points in the, as candidate matching points; wherein the first point cloud data and the second point cloud data are point cloud data of the same scene obtained from different viewing angles;

according to the first point cloud data, the second point cloud data and a preset search radius, determining at least one first neighboring point of the at least one first key point and at least one second neighboring point of the candidate matching point corresponding to the;

determining a matching point with which the is registered, according to the at least one first neighboring point of the at least one first key point and the at least one second neighboring point of the candidate matching points.

The above aspect and any possible implementation further provide an implementation: the point cloud data processing method further comprises: performing registration processing for the first point cloud data and second point cloud data according to the and the at least one matching point with which the is registered.

The above aspect and any possible implementation further provide an implementation: the step of, according to the first point cloud data, the second point cloud data and a preset search radius, determining at least one first neighboring point of the and at least one second neighboring point of the candidate matching point corresponding to the comprises:

regarding each first key point, determining a preset number of first neighboring points of the first key point according to the first point cloud data and a preset search radius; and, regarding the candidate matching points, determining a preset number of second neighboring points of the candidate matching points according to the second point cloud data and the preset search radius.

The above aspect and any possible implementation further provide an implementation: the step of, regarding each first key point, determining a preset number of first neighboring points of the first key point according to the first point cloud data and a preset search radius comprises:

determining a search space as a field space of the first key point, according to the preset search radius with the first key point as a center; and determining a preset number of points in the field space of the first key point as the first neighboring points of the first key point according to the first point cloud data.

The above aspect and any possible implementation further provide an implementation: the step of, regarding the candidate matching points, determining a preset number of second neighboring points of the candidate matching points according to the second point cloud data and the preset search radius comprises:

determining a search space according to the preset search radius with the candidate matching point as a center, as a field space of the candidate matching point; and determining a preset number of points in the field space of the candidate matching point as the second neighboring points of the candidate matching point according to the second point cloud data.

The above aspect and any possible implementation further provide an implementation: the determining a matching point with which the at least one first key point is registered according to the at least one first neighboring point of the at least one first key point and the at least one second neighboring point of the candidate matching points comprises:

obtaining third feature vectors of the first key points according to information of the first neighboring points of the first key points, and obtaining fourth feature vectors of the candidate matching points according to information of the second neighboring points of the candidate matching points;

obtaining offset vectors of the candidate matching points according to the third feature vectors and the fourth feature vectors; and generating matching points with which the first key points are registered according to the candidate matching points and the offset vectors of the candidate matching points.

The above aspect and any possible implementation further provide an implementation: the obtaining offset vectors of the candidate matching points according to the third feature vectors and the fourth feature vectors comprises:

obtaining matching feature vectors of the candidate matching points according to the third feature vectors and the fourth feature vectors; and performing dimension reduction processing for the matching feature vectors of the candidate matching points to obtain the offset vectors of the candidate matching points.

The above aspect and any possible implementation further provide an implementation: the point cloud data processing method further comprises:

adjusting the search radius;

using each adjusted search radius to obtain the third feature vectors and fourth feature vectors corresponding to the search radius.

In a further aspect of the present disclosure, there is provided a non-transitory computer readable storage medium with computer instructions stored thereon, wherein the computer instructions are used for causing a computer to perform a point cloud data processing method, wherein the point cloud data processing method comprises:

obtaining a first feature vector of each point in first point cloud data, and determining at least one first key point in the points in the first point cloud data according to the first feature vectors of respective points;

according to the and a preset first conversion parameter between second point cloud data and the first point cloud data, obtaining second key points of the second point cloud data corresponding to the first key points in the, as candidate matching points; wherein the first point cloud data and the second point cloud data are point cloud data of the same scene obtained from different viewing angles;

according to the first point cloud data, the second point cloud data and a preset search radius, determining at least one first neighboring point of the at least one first key point and at least one second neighboring point of the candidate matching point corresponding to the;

determining a matching point with which the is registered, according to the at least one first neighboring point of the at least one first key point and the at least one second neighboring point of the candidate matching points.

As known from the above technical solutions, in the embodiments of the present disclosure, the matching point corresponding to the key point in the first point cloud data may be generated so that the precision of the first point cloud data and second point cloud data can be improved.

In addition, when the technical solution according to the present application is employed, it is possible to, through a regression method, namely, the dimension reduction processing, directly obtain the offset vectors of the finally-generated matching points in the second point cloud data relative to the candidate matching points in the second point cloud data directly corresponding to the first key points in the first point cloud data, and then generate registered matching points with which the first key points are registered according to the candidate matching points and the offset vectors of the candidate matching points, thereby effectively enhancing the efficiency of the point cloud registration technique.

In addition, the technical solution according to the present disclosure can be employed to effectively reduce the number and the calculation amount of the candidate matching points, and further enhance the efficiency of the point cloud registration technique because it is unnecessary to draw a 3D grid for the search space of the second point cloud data and determine the candidate matching points based on grid voxels.

In addition, the technical solution according to the present disclosure can be employed to substantially reduce the calculation amount and substantially improve the efficiency of the point cloud registration technique because a 3D neural network needn't be used to perform the dimension reduction processing for a 3D grid.

In addition, the user's experience can be effectively improved by using the technical solution according to the present disclosure.

Other effects of the above aspect or possible implementations will be described below in conjunction with specific embodiments.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are some embodiments of the present disclosure. Those having ordinary skill in the art appreciate that other figures may be obtained from these figures without making inventive efforts. The figures are only intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., intelligent spectacles, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
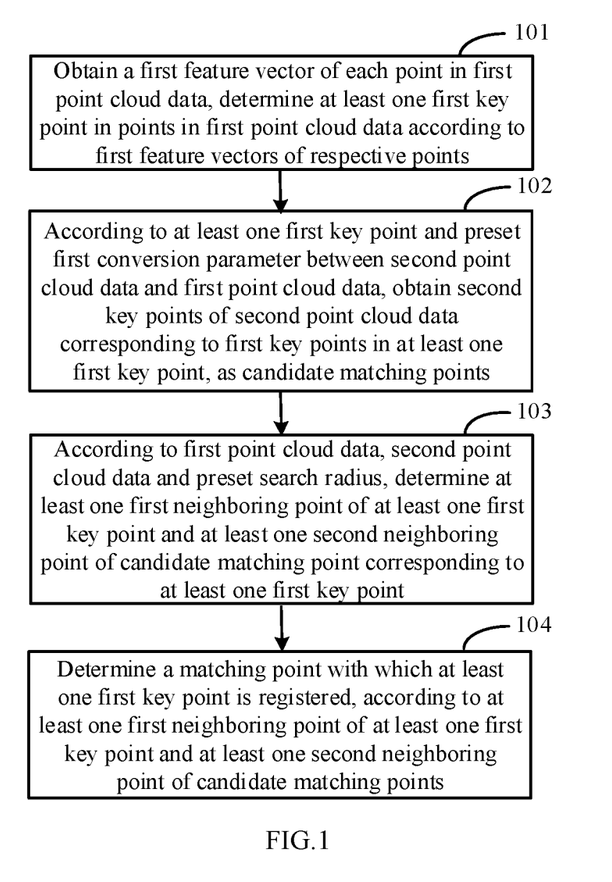
FIG. 1 illustrates a flow chart of a point cloud data processing method according to an embodiment of the present disclosure.

FIG. 1 illustrates a flow chart of a point cloud data processing method according to an embodiment of the present disclosure. As shown in FIG. 1, the method comprises the following steps:

101: obtaining a first feature vector of each point in first point cloud data, and determining at least one first key point in the points in the first point cloud data according to the first feature vectors of respective points.

102: according to the and a preset first conversion parameter between second point cloud data and the first point cloud data, obtaining second key points of the second point cloud data corresponding to the first key points in the, as candidate matching points; the first point cloud data and the second point cloud data are point cloud data of the same scene obtained from different viewing angles.

103: according to the first point cloud data, the second point cloud data and a preset search radius, determining at least one first neighboring point of the at least one first key point and at least one second neighboring point of the candidate matching point corresponding to the at least one first key point.

104: determining a matching point with which the is registered, according to the at least one first neighboring point of the at least one first key point and the at least one second neighboring point of the candidate matching points.

It needs to be appreciated that subjects for executing 101-104 may partially or totally be an application located in a local terminal, or a function unit such as a plug-in or Software Development Kit (SDK) in the application located in the local terminal, or a processing engine located in a network-side server or a distributed system located on the network side, for example, a processing engine or a distributed system in a processing platform on the side of the network. This is not particularly limited in the present embodiment.

It may be understood that the application may be a native application (nativeAPP) installed on the terminal, or a web program (webApp) of a browser on the terminal. This is not particularly limited in the present embodiment.

As such, the matching point corresponding to the key point in the first point cloud data may be generated so that the accuracy of registration of the first point cloud data and second point cloud data can be improved.

In the present disclosure, the first point cloud data and second point cloud data may be point cloud data of the same scene obtained from different viewing angles. In some specific scenes, the first point cloud data may be referred to as source point cloud data, and the second point cloud data may be referred to as target point cloud data. The first point cloud data and second point cloud data may be collected by a point cloud collecting device with a fixed posture. An electronic device on which the point cloud data processing method runs may obtain the first feature vectors of points in the first point cloud data from the local or other electronic devices. The first feature vectors may be obtained by the subject executing the steps or other electronic devices extracting the first point cloud data through various feature extracting algorithms.

For example, the first point cloud data may be specifically input to a pre-trained feature extracting model to obtain the feature vectors of the points.

In the present implementation, the feature extracting model is used to characterize a correspondence relationship between the points in the point cloud data and the feature vectors. Specifically, the first point cloud data may be input to the feature extracting model to obtain the feature vectors of the points in the point cloud data, which may be referred to as semantic feature vectors herein. The feature extracting model may be an artificial neural network, which abstracts a human brain neuron network from a perspective of information processing, builds a certain simple model, and forms different networks in different connection manners. The artificial neural network is usually formed by interconnecting a lot of nodes (or referred to as neurons), and each node represents a specific output function which is referred to as an excitation function. A connection between every two nodes represents a weight value, also called a weight (or called a parameter) through the connection signal, and the output of the network varies with the connection manner of the network, the weight value and the excitation weight. The artificial neural network usually comprises a plurality of layers, and each layer comprises a plurality of nodes. Usually, the weights of nodes of the same layer may be the same, the weights of nodes of different layers may be different, and therefore the parameters of the plurality of layers of the artificial neural network may be different. Here, the first point cloud data may be input from an input side of the artificial neural network, be subjected to the processing (e.g., product, convolution etc.) of the parameters of the layers in the artificial neural network, and be output from an output side of the artificial neural network. The information output from the output side is the feature vectors of the points.

In some specific application scenes, the feature extracting model may be PointNet++. The PointNet++ is an improved version of PointNet. A basic ideal of PointNet is to allow each point input into the point cloud data to learn the feature vector corresponding thereto, and then obtain a global point cloud feature using the feature vectors of all points. PointNet lacks extraction and processing of local features, and does not give thoughts to local sparsity of the point cloud data. PointNet++ proposes improvements regarding the above problem and solves two problems: how to locally divide the point cloud, and how to perform local feature extraction for the point cloud. PointNet++ is a network structure proposed by authors Charles R. Qi and Hao Su. The structure of PointNet++ is at the topmost level in respect of 3D point cloud data, solves the problem about how to process uneven sampling, also considers distance metrics between points in the space, and learns the features using local regional information through the layered structure. The network structure is more effective and robust.

After the first feature vector of each point in the first point cloud data is obtained, the of the first point cloud data may be determined according to the first feature vectors of respective points in the first point cloud data.

In the present embodiment, the first key point may be a point with some specific features which more conveniently achieve point cloud registration. For example, the first key point is a feature point of a static object.

For example, after the first feature vector of each point in the first point cloud data is obtained, dimension reduction may be performed for the first feature vectors to determine weights of the points in the first point cloud data, and then the first key point of the first point cloud data may be determined according to the weights of the points in the first point cloud data.

In the present embodiment, dimension reduction processing may be performed for the first feature vectors in many manners. For example, the first feature vectors are downsampled, or the first feature vectors are input into a convolution layer with a small number of convolution kernels. After dimension reduction processing is performed for the feature vectors, the weights of the points may be determined according to the feature vectors after the dimension reduction processing. The first key point is determined according to the weights of the points.

Specifically, the weights of the points in the first point cloud data may be determined through the following steps: inputting the first feature vectors into a pre-built key point determining model to obtain one-dimensional feature vectors of the first point cloud data; taking values in the one-dimensional feature vectors as the weights of the points in the first point cloud data. The key point determining model may include but not limited to a multi-layer perceptron. This is not particularly limited in the present embodiment.

Specifically, the first key points may be determined through the following steps: sorting the weights in a descending order; determining points corresponding to a preset number of weights ranking top, as the first key points of the first point cloud data.

In the present implementation, since the first point cloud data and second point cloud data may be point cloud data of the same scene obtained from different viewing angles, the first point cloud data and second point cloud data may be unified into the same coordinate system according to conversion parameters (R, T) between a coordinate system where the first point cloud data lie and a coordinate system where the second point cloud data lie. R is a rotation matrix of the two coordinate systems, and T is a translation vector between the two coordinate systems. In the present embodiment, the preset first conversion parameter may be obtained according to the posture of the point cloud collecting device. The coordinates of the first key points may be multiplied with the first conversion parameter, to obtain second key points in the second point cloud data.

Alternatively, in some other scenes, the second point cloud data may also be referred to as source point cloud data, and the first point cloud data may also be referred to as target point cloud data. The above operation is similar to that in the above-describe scene.

After the first key points in the first point cloud data and the second key points in the second point cloud data corresponding to the first key points are obtained, matching points with which the first key points are registered may be determined according to the first key points and the second key points corresponding to the first key points. The following technical solution may be specifically employed.

After the first key points in the first point cloud data and the second key points in the second point cloud data corresponding to the first key points are obtained, the matching points with which the first key points are registered may be specifically determined according to the, at least one second key point and the pre-built matching point generating model.

The matching point generating model is configured to characterize the relationship between the, the at least one second key point and the matching points. Furthermore, the matching point generating model may further be configured to character the correspondence relationship of the first feature vectors, the second feature vectors, the, the at least one second key point and the matching points.

In the present embodiment, the matching point generating model may be a list. The list comprises the correspondence relationship of the first feature vectors, the second feature vectors, the, the at least one second key point and the matching points. It is specifically possible to search the list according to the first feature vectors, the second feature vectors, the and the at least one second key point, and output a corresponding matching point.

The matching point generating model may further be a neural network. The first feature vectors, the second feature vectors, the and the at least one second key point may be input from an input side of the neural network, be subjected to the processing of processing layers (e.g., convolutional layer, pooling layer etc.) of the neural network, and then output from the output side of the neural network to obtain the matching point.

The matching point generating model may further be a combination of a neural network and a list. The neural network may be used to extract features of input data. Specifically, the first feature vectors, the second feature vectors, the at least one first key point and the at least one second key point may be input from the input side of the neural network, be subjected to the processing of processing layers (e.g., convolutional layer, pooling layer etc.) of the neural network, and then output from the output side of the neural network to obtain feature data. Then, the list including the correspondence relationship between the feature data and matching points is searched to obtain the matching points.

In the present embodiment, the matching points are points with which the first key points are registered. The matching points might be totally points in the second point cloud data, or partially be points in the second point cloud data, or totally not points in the second point cloud data. This is not particularly limited in the present embodiment.

After the matching points are obtained, registration processing may be further performed for the first point cloud data and second point cloud data according to the at least one first key point and at least one matching point with which the at least one first key point is registered.

According to the method of the present embodiment, it is feasible to generate the matching point with which the key point in the first point cloud data is registered, and thereby improve the accuracy in the registration of the first point cloud data and the second point cloud data.

After the first key points in the first point cloud data and the second key points in the second point cloud data corresponding to the first key points are obtained, the second key points corresponding to the first key points may be taken as candidate matching points. A process of an embodiment of determining the matching points may comprise the following steps a-c:

Step a: regarding the first key points, determining a preset number of first neighboring points of the first key points according to the first point cloud data and a preset search radius.

Specifically, regarding each first key point, the preset number of first neighboring points of the first key point may be first determined according to the preset search radius. Specifically, a searching space may be determined according to the search radius. The search space may be a whole data range of the first point cloud data.

Then, in the search space, it is possible to first determine distances between points in the first point cloud data and the first key point, then sort the obtained distances in an ascending order, and take a preset number of points ranking top as the first neighboring points of the first key point.

For example, the search space is determined as a field space of the first key point, according to the preset search radius with the first key point as a center, and then, the preset number of points in the field space are determined as the first neighboring points of the first key point according to the first point cloud data.

Step b: regarding the candidate matching points, a preset number of second neighboring points of the candidate matching points are determined according to the second point cloud data and the preset search radius.

Specifically, regarding each candidate matching point, a preset number of second neighboring points of the candidate matching point may be first determined according to the preset search radius. Specifically, the search space may be determined according to the search radius. The search space may be a whole data range of the second point cloud data.

Then, in the search space, it is possible to first determine distances between points in the second point cloud data and the candidate matching point, then sort the obtained distances in an ascending order, and take a preset number of points ranking top as the second neighboring points of the candidate matching point.

For example, the search space is determined according to the preset search radius with the candidate matching point as a center, as a field space of the candidate matching point, and then, the preset number of points in the field space are determined as the second neighboring points of the candidate matching point according to the second point cloud data.

Step c: determining the matching points with which the first key points are registered according to the first neighboring points of the first key points and the second neighboring points of the candidate matching points.

After the first neighboring points and second neighboring points are determined, at least one matching point may be specifically determined according to the first feature vectors, the second feature vectors, the first neighboring points, the second neighboring points and the matching point generating model. Specifically, the matching point generating model may include but not limited to a feature extracting sub-model and a matching point generating sub-model. The feature extracting sub-model is configured to extract features of input data, and the matching point generating sub-model is configured to generate the matching point according to the input data.

Specifically, it is specifically possible to obtain third feature vectors of the first key points according to information of the first neighboring points of the first key points, and obtain fourth feature vectors of the candidate matching points according to information of the second neighboring points of the candidate matching points, and then obtain offset vectors of the candidate matching points according to the third feature vectors and fourth feature vectors. Then, it is possible to generate the matching points with which the first key points are registered according to the candidate matching points and the offset vectors of the candidate matching points.

For example, it is specifically possible to obtain matching feature vectors of the candidate matching points according to the third feature vectors and the fourth feature vectors, and perform dimension reduction processing for the matching feature vectors of the candidate matching points to obtain the offset vectors of the candidate matching points.

In the present embodiment, it is possible to first determine the information of the first neighboring points according to the first point cloud data, and determine the information of the second neighboring points according to the second point cloud data. The information of the first neighboring points may include but not limited to laser reflection intensity of the first neighboring points; the information of the second neighboring points may include but not limited to laser reflection intensity of the second neighboring points. This is not particularly limited in the present embodiment.

After the information of the first neighboring points and information of the second neighboring points is obtained, the first feature vectors, the second feature vectors, the information of the first neighboring points and the information of the second neighboring points may be input into the feature extracting sub-model to obtain the third feature vectors of the first key points and fourth feature vectors of the candidate key points of the second key points. The feature extracting sub-model may include a multi-layer perceptron. Specifically, the number of dimensions of the output feature vectors may be adjusted by adjusting the number of neurons of each layer in the multi-layer perceptron.

In the present embodiment, the feature extracting sub-model further extracts local features of the first point cloud data and second point cloud data to obtain more detailed feature vectors, which may be referred to as geometrical feature vectors here. These feature vectors may more completely represent features of objects in the first point cloud data and second point cloud data, so that a finally-obtained matching degree is more precise. In some specific application scenes, the feature extracting sub-model may be a mini-PointNet structure.

For example, regarding each first key point in the, relative coordinates of the first neighboring points relative to the first key point are determined according to coordinates of the first key point and coordinates of the first neighboring points of the first key point, i.e., the first key point is taken as an origin of the coordinate system, and relative coordinates of the first neighboring points in the coordinate system are determined. Regarding each second key point in the at least one second key point, namely, each candidate matching point, relative coordinates of the second neighboring points relative to the candidate matching point are determined according to coordinates of the candidate matching point and coordinates of the second neighboring points of the candidate matching point, i.e., the candidate matching point is taken as an origin of the coordinate system, and relative coordinates of the second neighboring points in the coordinate system are determined.

After the relative coordinates of the first neighboring points relative to the first key point and relative coordinates of the second neighboring points relative to the candidate matching point are obtained, the first feature vectors, the second feature vectors, the obtained relative coordinates and laser reflection intensity of the first neighboring points, and the obtained relative coordinates and laser reflection intensity of the second neighboring points may be input into the feature extracting sub-model to obtain the third feature vectors of the first key points and fourth feature vectors of the candidate matching points.

Further optionally, after the relative coordinates of the first neighboring points and relative coordinates of the second neighboring points are determined, normalization processing may be further performed for the above relative coordinates. Then, the first feature vectors, the second feature vectors, the obtained normalized coordinates and later reflection intensity of the first neighboring points, and the obtained normalized coordinates and laser reflection intensity of the second neighboring points may be input into the feature extracting sub-model to obtain the third feature vectors of the first key points and fourth feature vectors of the candidate matching points.

After the third feature vectors of the first key points and fourth feature vectors of the candidate matching points are obtained, the obtained third feature vectors, fourth feature vectors and candidate matching points may be input into the matching point generating sub-model to determine at last one matching point.

After the third feature vectors and fourth feature vectors are obtained, they together with candidate matching points may be input into the matching point generating sub-model to determine at last one matching point.

The working principle of the matching point generating sub-model is: regarding each second key point in the at least one second key point, namely, each candidate matching point, offset vectors of the candidate matching points may be obtained according to the third feature vectors of the first key points corresponding to the candidate matching points and fourth feature vectors of the candidate matching points, and then at least one matching point is determined according to the obtained offset vectors and the at least one candidate matching point.

Specifically, a difference between the third feature vectors of the first key points corresponding to the candidate matching points and fourth feature vectors of the candidate matching points may be calculated, and the offset vectors of the candidate matching points may be determined according to the difference. Then, the at least one matching point, namely, the matching point with which the first key points are registered may be determined according to the obtained offset vectors and the candidate matching points.

The matching point generating sub-model may include a neural network such as a multi-layer perceptron (MLP). The neural network may perform dimension reduction processing for the input feature data (namely, the difference between the fourth feature vectors and the third feature vectors) to finally obtain a one-dimensional vector as the offset vector. Then, a final matching point is obtained according to the candidate matching points and the offset vectors.

In the present embodiment, due to local sparsity of the point cloud data, the second point cloud data might not have exact a matching point corresponding to the first point cloud data. In the present embodiment, the matching point generating sub-model is employed to generate, from the extracted features, the matching point corresponding to the first point cloud data, thereby improving the accuracy of the matching point.

Furthermore, in the present implementation, it is further possible to adjust the search radius, use each adjusted search radius to obtain the third feature vectors and fourth feature vectors corresponding to the search radius, and thereby use the multi-layer perceptron (MLP) to fuse them into final third feature vectors and fourth feature vectors.

As such, it is possible to, through a regression method, namely, the dimension reduction processing, directly obtain the offset vectors of the finally-generated matching points in the second point cloud data relative to the candidate matching points in the second point cloud data directly corresponding to the first key points in the first point cloud data, and then generate registered matching points with which the first key points are registered according to the candidate matching points and the offset vectors of the candidate matching points, thereby effectively enhancing the efficiency of the point cloud registration technique.

As compared with the preceding implementation, the present implementation effectively reduces the number and the calculation amount of the candidate matching points, and further enhances the efficiency of the point cloud registration technique because it is unnecessary to draw a 3D grid for the search space of the second point cloud data and determine the candidate matching points based on grid voxels. In addition, the present implementation can substantially reduce the calculation amount and substantially improve the efficiency of the point cloud registration technique because the 3D neural network needn't be used to perform the dimension reduction processing.

In the present embodiment, the matching point corresponding to the key point in the first point cloud data may be generated so that the precision of the first point cloud data and second point cloud data can be improved.

In addition, when the technical solution according to the present application is employed, it is possible to, through a regression method, namely, the dimension reduction processing, directly obtain the offset vectors of the finally-generated matching points in the second point cloud data relative to the candidate matching points in the second point cloud data directly corresponding to the first key points in the first point cloud data, and then generate registered matching points with which the first key points are registered according to the candidate matching points and the offset vectors of the candidate matching points, thereby effectively enhancing the efficiency of the point cloud registration technique.

In addition, the technical solution according to the present disclosure can be employed to effectively reduce the number and the calculation amount of the candidate matching points, and further enhance the efficiency of the point cloud registration technique because it is unnecessary to draw a 3D grid for the search space of the second point cloud data and determine the candidate matching points based on grid voxels.

In addition, the technical solution according to the present disclosure can be employed to substantially reduce the calculation amount and substantially improve the efficiency of the point cloud registration technique because the 3D neural network needn't be used to perform the dimension reduction processing for the 3D grid.

In addition, the user's experience can be effectively improved by using the technical solution according to the present disclosure.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, embodiments are respectively described with different emphasis being placed, and reference may be made to related depictions in other embodiments for portions not detailed in a certain embodiment.

Figure 2A:
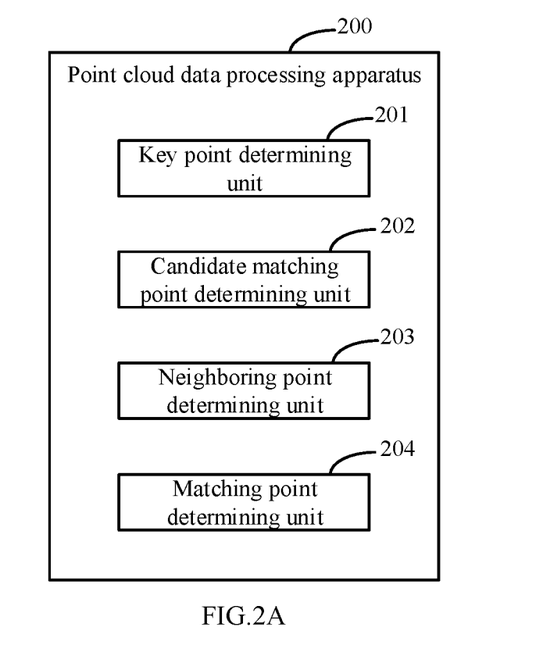
FIG. 2A illustrates a block diagram of a point cloud data processing apparatus according to another embodiment of the present disclosure.

FIG. 2A illustrates a block diagram of a point cloud data processing apparatus according to another embodiment of the present disclosure. As shown in FIG. 2A, the point cloud data processing apparatus 200 may comprise a key point determining unit 201, a candidate matching point determining unit 202, a neighboring point determining unit 203 and a matching point determining unit 204. The key point determining unit 201 is configured to obtain a first feature vector of each point in first point cloud data, and determine at least one first key point in the points in the first point cloud data according to the first feature vectors of the points; the candidate matching point determining unit 202 is configured to, according to the at least one first key point and a preset first conversion parameter between second point cloud data and the first point cloud data, obtain second key points of the second point cloud data corresponding to the first key points in the, as candidate matching points; wherein the first point cloud data and the second point cloud data are point cloud data of the same scene obtained from different viewing angles; the neighboring point determining unit 203 is configured to, according to the first point cloud data, the second point cloud data and a preset search radius, determine at least one first neighboring point of the and at least one second neighboring point of the candidate matching point corresponding to the; the matching point determining unit 204 is configured to determine a matching point with which the is registered, according to the at least one first neighboring point of the and the at least one second neighboring point of the candidate matching points.

It needs to be appreciated that subject for executing the point cloud data processing apparatus according to the present embodiment may partially or totally be an application located in a local terminal, or a function unit such as a plug-in or Software Development Kit (SDK) in the application located in the local terminal, or a processing engine located in a network-side server or a distributed system located on the network side, for example, a processing engine or a distributed system in a processing platform on the side of the network. This is not particularly limited in the present embodiment.

It may be understood that the application may be a native application (nativeAPP) installed on the terminal, or a web program (webApp) of a browser on the terminal. This is not particularly limited in the present embodiment.

Figure 2B:
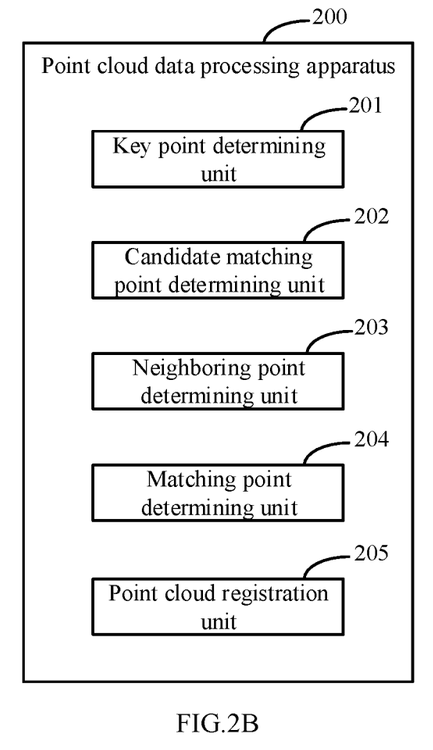
FIG. 2B illustrates a block diagram of a point cloud data processing apparatus according to a further embodiment of the present disclosure.

Optionally, in a possible implementation of the present embodiment, as shown in FIG. 2B, the point cloud data processing apparatus according to the present embodiment may further comprise a point cloud registration unit 205 configured to perform registration processing for the first point cloud data and second point cloud data according to the and the at least one matching point with which the is registered.

Optionally, in a possible implementation of the present embodiment, the neighboring point determining unit 203 is specifically configured to, regarding each first key point, determine a preset number of first neighboring points of the first key point according to the first point cloud data and a preset search radius; and, regarding the candidate matching points, determine a preset number of second neighboring points of the candidate matching points according to the second point cloud data and the preset search radius.

In a specific implementation, the neighboring point determining unit 203 may specifically be configured to determine the search space as a field space of the first key point, according to the preset search radius with the first key point as a center; and determine a preset number of points in the field space of the first key point as the first neighboring points of the first key point according to the first point cloud data.

In another specific implementation, the neighboring point determining unit 203 may specifically be configured to determine the search space according to the preset search radius with the candidate matching point as a center, as a field space of the candidate matching point; and determine a preset number of points in the field space of the candidate matching point as the second neighboring points of the candidate matching point according to the second point cloud data.

Optionally, in a possible implementation of the present embodiment, the matching point determining unit 204 may specifically be configured to obtain third feature vectors of the first key points according to information of the first neighboring points of the first key points, and obtain fourth feature vectors of the candidate matching points according to information of the second neighboring points of the candidate matching points; obtain offset vectors of the candidate matching points according to the third feature vectors and fourth feature vectors; and generate the matching points with which the first key points are registered according to the candidate matching points and the offset vectors of the candidate matching points.

Specifically, the matching point determining unit 204 may specifically be configured to obtain matching feature vectors of the candidate matching points according to the third feature vectors and the fourth feature vectors; and perform dimension reduction processing for the matching feature vectors of the candidate matching points to obtain the offset vectors of the candidate matching points.

Furthermore, the neighboring point determining unit 203 may be further configured to adjust the search radius; correspondingly, the matching point determining unit 204 may specifically be configured to use each adjusted search radius to obtain the third feature vectors and fourth feature vectors corresponding to the search radius.

It needs to be appreciated that the method in the embodiment corresponding to FIG. 1 may be implemented by the point cloud data processing apparatus according to the present embodiment. Reference may be made to relevant content in the embodiment corresponding to FIG. 1 for detailed depictions. Details will not be presented any more here.

In the present embodiment, the matching point corresponding to the key point in the first point cloud data may be generated so that the precision of the first point cloud data and second point cloud data can be improved.

In addition, when the technical solution according to the present application is employed, it is possible to, through a regression method, namely, the dimension reduction processing, directly obtain the offset vectors of the finally-generated matching points in the second point cloud data relative to the candidate matching points in the second point cloud data directly corresponding to the first key points in the first point cloud data, and then generate registered matching points with which the first key points are registered according to the candidate matching points and the offset vectors of the candidate matching points, thereby effectively enhancing the efficiency of the point cloud registration technique.

In addition, the technical solution according to the present disclosure can be employed to effectively reduce the number and the calculation amount of the candidate matching points, and further enhance the efficiency of the point cloud registration technique because it is unnecessary to draw a 3D grid for the search space of the second point cloud data and determine the candidate matching points based on grid voxels.

In addition, the technical solution according to the present disclosure can be employed to substantially reduce the calculation amount and substantially improve the efficiency of the point cloud registration technique because the 3D neural network needn't be used to perform the dimension reduction processing for the 3D grid.

In addition, the user's experience can be effectively improved by using the technical solution according to the present disclosure.

According to embodiments of the present disclosure, the present disclosure further provides an electronic device and a non-transitory computer readable storage medium in which computer instructions are stored.

Figure 3:
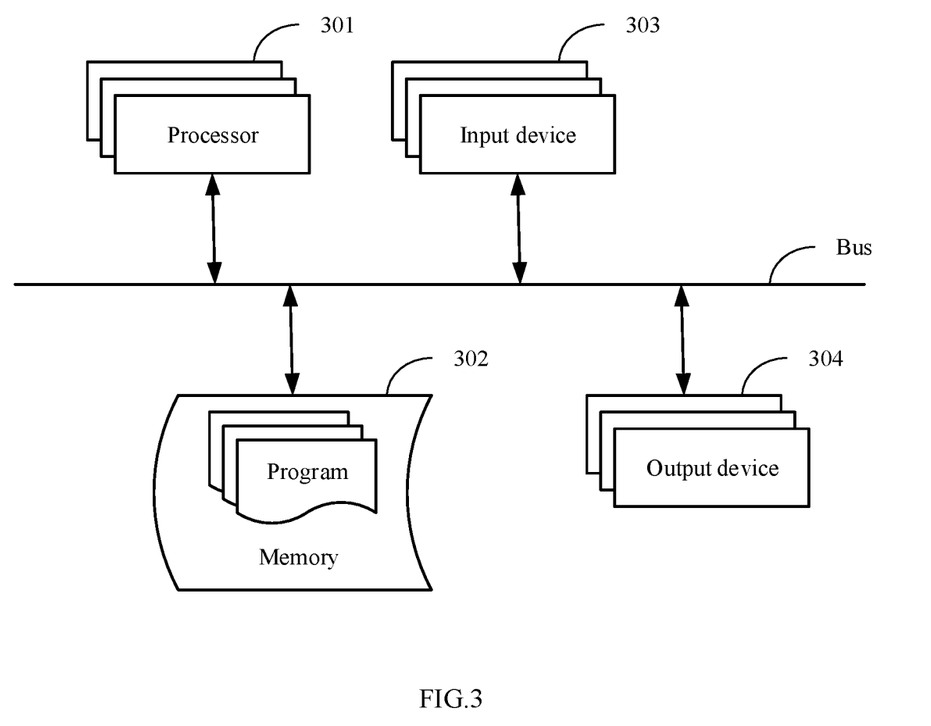
FIG. 3 illustrates a block diagram of an electronic device for implementing the point cloud data processing method according to embodiments of the present disclosure.

As shown in FIG. 3, it shows a block diagram of an electronic device for implementing the point cloud data processing method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 3, the electronic device comprises: one or more processors 301, a memory 302, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 301 is taken as an example in FIG. 3.

The memory 302 is a non-transitory computer readable storage medium provided by the present disclosure. The memory stores instructions executable by at least one processor, so that the at least one processor executes the point cloud data processing method according to the present disclosure. The non-transitory computer readable storage medium of the present disclosure stores computer instructions, which are used to cause a computer to execute the point cloud data processing method according to the present disclosure.

The memory 302 is a non-transitory computer readable storage medium and can be used to store non-transitory software programs, non-transitory computer executable programs and modules, such as program instructions/modules (e.g., the key point determining unit 201, the candidate matching point determining unit 202, the neighboring point determining unit 203 and the matching point determining unit 204) corresponding to the point cloud data processing method according to embodiments of the present disclosure. The processor 301 executes various functional applications and data processing of the server, i.e., implements the point cloud data processing method according to embodiments of the present disclosure, by running the non-transitory software programs, instructions and units stored in the memory 302.

The memory 302 may include a storage program region and a storage data region, wherein the storage program region may store an operating system and an application program needed by at least one function; the storage data region may store data created by the use of the electronic device for implementing the point cloud data processing method according to embodiments of the present disclosure. In addition, the memory 302 may include a high-speed random access memory, and may also include a non-transitory memory, such as at least one magnetic disk storage device, a flash memory device, or other non-transitory solid-state storage device. In some embodiments, the memory 302 may optionally include a memory remotely arranged relative to the processor 301, and these remote memories may be connected to the electronic device for implementing the point cloud data processing method according to embodiments of the present disclosure. Examples of the above network include, but are not limited to, the Internet, an intranet, a local area network, a mobile communication network, and combinations thereof.

The electronic device for implementing the point cloud data processing method may further include an input device 303 and an output device 304. The processor 301, the memory 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for implementing the point cloud data processing method according to embodiments of the present disclosure, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According to technical solutions of the embodiments of the present disclosure, the matching point corresponding to the key point in the first point cloud data may be generated so that the precision of the first point cloud data and second point cloud data can be improved.

In addition, when the technical solution according to the present application is employed, it is possible to, through a regression method, namely, the dimension reduction processing, directly obtain the offset vectors of the finally-generated matching points in the second point cloud data relative to the candidate matching points in the second point cloud data directly corresponding to the first key points in the first point cloud data, and then generate registered matching points with which the first key points are registered according to the candidate matching points and the offset vectors of the candidate matching points, thereby effectively enhancing the efficiency of the point cloud registration technique.

In addition, the technical solution according to the present disclosure can be employed to effectively reduce the number and the calculation amount of the candidate matching points, and further enhance the efficiency of the point cloud registration technique because it is unnecessary to draw a 3D grid for the search space of the second point cloud data and determine the candidate matching points based on grid voxels.

In addition, the technical solution according to the present disclosure can be employed to substantially reduce the calculation amount and substantially improve the efficiency of the point cloud registration technique because the 3D neural network needn't be used to perform the dimension reduction processing for the 3D grid.

In addition, the user's experience can be effectively improved by using the technical solution according to the present disclosure.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented point cloud data processing method, wherein the method comprises:
   obtaining a first feature vector of each point in first point cloud data, and determining at least two first key points in the points in the first point cloud data according to the first feature vectors of respective points, first key point in the at least two first key points being a feature point of a static object;
   according to the at least two first key points and a preset first conversion parameter between second point cloud data and the first point cloud data, obtaining second key points of the second point cloud data corresponding to each first key points in the at least two first key points, as candidate matching points; wherein the first point cloud data and the second point cloud data are point cloud data of the same scene obtained from different viewing angles, and the first point cloud data and the second point cloud data are collected by a point cloud collecting device with a fixed posture;
   regarding each first key point, determining a preset number of first neighboring points of the first key point according to the first point cloud data and a preset search radius;
   regarding the candidate matching points, determining a preset number of second neighboring points of the candidate matching points according to an ascending order of distances between points in the second point cloud data and the candidate matching points;
   determining a matching point with which each of the at least two first key points is registered, according to the at least one first neighboring point of the at least two first key points and the at least one second neighboring point of the candidate matching points.

2. The method according to claim 1, wherein the method further comprises:
   performing registration processing for the first point cloud data and second point cloud data according to the at least two first key points and the at least one matching point with which each of the at least two first key points is registered.

3. The method according to claim 1, wherein the step of, regarding each first key point, determining a preset number of first neighboring points of the first key point according to the first point cloud data and a preset search radius comprises:
   determining a search space as a field space of the first key point, according to the preset search radius with the first key point as a center;
   determining a preset number of points in the field space of the first key point as the first neighboring points of the first key point according to the first point cloud data.

4. The method according to claim 1, wherein the step of, regarding the candidate matching points, determining a preset number of second neighboring points of the candidate matching points according to the second point cloud data and the preset search radius comprises:
   determining a search space according to the preset search radius with a candidate matching point in the candidate matching points as a center, as a field space of the candidate matching point;
   determining a preset number of points in the field space of the candidate matching point as the second neighboring points of the candidate matching point according to the second point cloud data.

5. The method according to claim 1, wherein the determining a matching point with which each of the at least two first key points is registered, according to the at least one first neighboring point of the at least two first key points and the at least one second neighboring point of the candidate matching points comprises:
   obtaining third feature vectors of the first key points according to information of the first neighboring points of the first key points, and obtaining fourth feature vectors of the candidate matching points according to information of the second neighboring points of the candidate matching points;
   obtaining offset vectors of the candidate matching points according to the third feature vectors and the fourth feature vectors;

generating matching points with which the first key points are registered according to the candidate matching points and the offset vectors of the candidate matching points.

6. The method according to claim 5, wherein the obtaining offset vectors of the candidate matching points according to the third feature vectors and the fourth feature vectors comprises:
obtaining matching feature vectors of the candidate matching points according to the third feature vectors and the fourth feature vectors;
performing dimension reduction processing for the matching feature vectors of the candidate matching points to obtain the offset vectors of the candidate matching points, wherein the dimension reduction processing comprises down-sampling the matching feature vectors or inputting the matching feature vectors into a convolution layer with a preset number of convolution kernels.

7. The method according to claim 5, wherein the method further comprises:
adjusting the search radius, and using each adjusted search radius to obtain the third feature vectors and fourth feature vectors corresponding to the search radius.

8. An electronic device, comprising:
at least one processor; and
a memory communicatively connected with the at least one processor;
wherein the memory stores instructions executable by the at least one processor, and the instructions are executed by the at least one processor to enable the at least one processor to perform a point cloud data processing method, wherein the point cloud data processing method comprises:
obtaining a first feature vector of each point in first point cloud data, and determining at least two first key points in the points in the first point cloud data according to the first feature vectors of respective points, first key point in the at least two first key points being a feature point of a static object;
according to the at least two first key points and a preset first conversion parameter between second point cloud data and the first point cloud data, obtaining second key points of the second point cloud data corresponding to each first key points in the at least two first key points, as candidate matching points; wherein the first point cloud data and the second point cloud data are point cloud data of the same scene obtained from different viewing angles, and the first point cloud data and the second point cloud data are collected by a point cloud collecting device with a fixed posture;
regarding each first key point, determining a preset number of first neighboring points of the first key point according to the first point cloud data and a preset search radius;
regarding the candidate matching points, determining a preset number of second neighboring points of the candidate matching points according to an ascending order of distances between points in the second point cloud data and the candidate matching point;
determining a matching point with which each of the at least two first key points is registered, according to the at least one first neighboring point of the at least two first key points and the at least one second neighboring point of the candidate matching points.

9. The electronic device according to claim 8, wherein the point cloud data processing method further comprises:
performing registration processing for the first point cloud data and second point cloud data according to the at least two first key points and the at least one matching point with which each of the at least two first key points is registered.

10. The electronic device according to claim 8, wherein the step of, regarding each first key point, determining a preset number of first neighboring points of the first key point according to the first point cloud data and a preset search radius comprises:
determining a search space as a field space of the first key point, according to the preset search radius with the first key point as a center; and
determining a preset number of points in the field space of the first key point as the first neighboring points of the first key point according to the first point cloud data.

11. The electronic device according to claim 8, wherein the step of, regarding the candidate matching points, determining a preset number of second neighboring points of the candidate matching points according to the second point cloud data and the preset search radius comprises:
determining a search space according to the preset search radius with a candidate matching point in the candidate matching points as a center, as a field space of the candidate matching point; and
determining a preset number of points in the field space of the candidate matching point as the second neighboring points of the candidate matching point according to the second point cloud data.

12. The electronic device according to claim 8, wherein the determining a matching point with which each of the at least two first key points is registered, according to the at least one first neighboring point of the at least two first key points and the at least one second neighboring point of the candidate matching points comprises:
obtaining third feature vectors of the first key points according to information of the first neighboring points of the first key points, and obtaining fourth feature vectors of the candidate matching points according to information of the second neighboring points of the candidate matching points;
obtaining offset vectors of the candidate matching points according to the third feature vectors and the fourth feature vectors; and
generating matching points with which the first key points are registered according to the candidate matching points and the offset vectors of the candidate matching points.

13. The electronic device according to claim 12, wherein the obtaining offset vectors of the candidate matching points according to the third feature vectors and the fourth feature vectors comprises:
obtaining matching feature vectors of the candidate matching points according to the third feature vectors and the fourth feature vectors; and
performing dimension reduction processing for the matching feature vectors of the candidate matching points to obtain the offset vectors of the candidate matching points, wherein the dimension reduction processing comprises down-sampling the matching feature vectors or inputting the matching feature vectors into a convolution layer with a preset number of convolution kernels.

14. The electronic device according to claim 12, wherein the point cloud data processing method further comprises:

adjusting the search radius;

and using each adjusted search radius to obtain the third feature vectors and fourth feature vectors corresponding to the search radius.

15. A non-transitory computer readable storage medium with computer instructions stored thereon, wherein the computer instructions are used for causing a computer to perform a point cloud data processing method, wherein the point cloud data processing method comprises:

obtaining a first feature vector of each point in first point cloud data, and determining at least two first key points in the points in the first point cloud data according to the first feature vectors of respective points, first key point in the at least two first key points being a feature point of a static object;

according to the at least two first key points and a preset first conversion parameter between second point cloud data and the first point cloud data, obtaining second key points of the second point cloud data corresponding to each first key points in the at least two first key points, as candidate matching points; wherein the first point cloud data and the second point cloud data are point cloud data of the same scene obtained from different viewing angles, and the first point cloud data and the second point cloud data are collected by a point cloud collecting device with a fixed posture;

regarding each first key point, determining a preset number of first neighboring points of the first key point according to the first point cloud data and a preset search radius;

regarding the candidate matching points, determining a preset number of second neighboring points of the candidate matching points according to an ascending order of distances between points in the second point cloud data and the candidate matching points;

determining a matching point with which each the at least two first key points is registered, according to the at least one first neighboring point of the at least two first key points and the at least one second neighboring point of the candidate matching points.

16. The non-transitory computer readable storage medium according to claim 15, wherein the point cloud data processing method further comprises:

performing registration processing for the first point cloud data and second point cloud data according to the at least two first key points and the at least one matching point with which each of the at least two first key points is registered.

17. The non-transitory computer readable storage medium according to claim 15, wherein the step of, regarding each first key point, determining a preset number of first neighboring points of the first key point according to the first point cloud data and a preset search radius comprises:

determining a search space as a field space of the first key point, according to the preset search radius with the first key point as a center;

determining a preset number of points in the field space of the first key point as the first neighboring points of the first key point according to the first point cloud data.

* * * * *